US012737051B2

(12) United States Patent
Sun et al.

(10) Patent No.: US 12,737,051 B2

(45) Date of Patent: Sep. 15, 2026

(54) MAP DISPLAY ADJUSTMENT METHOD AND APPARATUS

(71) Applicant: Beijing Roborock Technology Co., Ltd., Beijing (CN)

(72) Inventors: Jianbin Sun, Beijing (CN); Yuxuan Li, Beijing (CN); Yiming Cong, Beijing (CN)

(73) Assignee: BEIJING ROBOROCK INNOVATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/725,792

(22) PCT Filed: Jul. 13, 2022

(86) PCT No.: PCT/CN2022/105552

§ 371 (c)(1),
(2) Date: Jun. 30, 2024

(87) PCT Pub. No.: WO2023/124014

PCT Pub. Date: Jul. 6, 2023

(65) Prior Publication Data

US 2025/0103142 A1 Mar. 27, 2025

(30) Foreign Application Priority Data

Dec. 31, 2021 (CN) ......................... 202111678189.6

(51) Int. Cl.
*G06F 3/04845* (2022.01)
*G06F 3/01* (2006.01)

(52) U.S. Cl.
CPC .......... *G06F 3/017* (2013.01); *G06F 3/04845* (2013.01); *G06F 2203/04806* (2013.01); *G06F 2203/04808* (2013.01)

(58) Field of Classification Search
CPC ................. G06F 3/017; G06F 3/04845; G06F 2203/04806; G06F 2203/04808
See application file for complete search history.

(56) References Cited

U.S. PATENT DOCUMENTS 10,782,873 B2 9/2020 Piemonte et al.
2010/0171712 A1 7/2010 Cieplinski et al.
(Continued)

FOREIGN PATENT DOCUMENTS

CN 104471518 A 3/2015
CN 106959808 A 7/2017
(Continued)

OTHER PUBLICATIONS

International Search Report from PCT/CN2022/105552 dated Oct. 10, 2022.

(Continued)

*Primary Examiner* — Afroza Chowdhury
(74) *Attorney, Agent, or Firm* — Calfee, Halter & Griswold LLP

(57) ABSTRACT

Disclosed are a map display adjustment method and apparatus, the method including: acquiring adjustment gesture data when receiving an adjustment instruction of a map display page, the adjustment instruction being sent by a user on the map display page by a touch display screen, and the adjustment gesture data at least including an adjustment start finger position and an adjustment end finger position; analyzing the adjustment gesture data to acquire adjustment indexes, the adjustment indexes being configured to identify a position change of an adjustment gesture in a current map display adjustment process; and scaling the map display page and rotating the map display page at a first view angle and a second view angle according to the adjustment indexes, the first view angle being a view angle in a map (Continued)

parallel plane and the second view angle being a view angle in a map tangent plane.

15 Claims, 5 Drawing Sheets

(56) References Cited

U.S. PATENT DOCUMENTS

| | | | | |
|---|---|---|---|---|
| 2011/0012848 | A1 | 1/2011 | Li | |
| 2013/0321400 | A1 | 12/2013 | Van Os et al. | |
| 2013/0321472 | A1* | 12/2013 | Piemonte | G06F 1/1626 345/672 |
| 2013/0332070 | A1* | 12/2013 | Fleizach | G01C 21/20 701/438 |
| 2014/0019917 | A1* | 1/2014 | Piemonte | G06F 3/017 715/848 |
| 2014/0365935 | A1* | 12/2014 | Moha | G06F 3/04842 715/769 |
| 2016/0170596 | A1* | 6/2016 | Kimura | G06F 3/04847 715/784 |
| 2017/0205885 | A1* | 7/2017 | Schpok | G01C 21/26 |
| 2017/0371512 | A1* | 12/2017 | Moore | G06F 3/0486 |
| 2019/0221047 | A1* | 7/2019 | Adlers | G06T 19/20 |
| 2020/0174654 | A1 | 6/2020 | Blanchard | |
| 2021/0141525 | A1* | 5/2021 | Piemonte | G06F 3/04815 |

FOREIGN PATENT DOCUMENTS

| | | | |
|---|---|---|---|
| CN | 110019630 | A | 7/2019 |
| CN | 110301136 | A | 10/2019 |
| CN | 111984117 | A | 11/2020 |
| CN | 112416236 | A | 2/2021 |
| CN | 114594899 | A | 6/2022 |
| EP | 2128748 | A2 | 12/2009 |
| JP | 2008508601 | A | 3/2008 |
| JP | 2015526807 | A | 9/2015 |
| JP | 6399744 | B2 | 10/2018 |
| KR | 20100083432 | A | 7/2010 |
| KR | 20140135276 | A | 11/2014 |
| WO | 2016/071171 | A1 | 5/2016 |

OTHER PUBLICATIONS

Office action from Chinese Application No. 202111678189.6 dated Jun. 12, 2024.
First Office Action of JP application No. 2024-539284 dated Aug. 5, 2025.
Extended European Search Report of application No. 22913303.8 dated Nov. 13, 2025.
Second Office Action of AU application No. 2022425878 dated Jan. 27, 2026.
Article titled "A pan, zoom, and rotate gesture model for touch devices" Published Mar. 16, 2016.
Notice of Allowance of JP application No. 2024-539284 dated May 26, 2026.

* cited by examiner

MAP DISPLAY ADJUSTMENT METHOD AND APPARATUS

CROSS-REFERENCE TO RELATED APPLICATION

This application is a US national phase of PCT international application No. PCT/CN2022/105552 filed on Jul. 13, 2022, which claims priority of the Chinese Patent Application No. 202111678189.6, filed on Dec. 31, 2021, which are incorporated herein by reference in their entirety as a part of the present application.

TECHNICAL FIELD

The present disclosure relates to the technical field of data processing, in particular, to a method and an apparatus for adjusting map display.

BACKGROUND ART

With the increasingly rich functions of mobile terminals, intelligent terminal devices are indispensable for daily life. Users can do office, shopping, housework and the like through the mobile terminals, and map applications are also one of the applications with relatively high demands in the mobile terminals. The map applications can provide accurate map data and plan travel routes according to needs of the users. For this reason, the users can look for destinations and navigate routes through the map applications. When displaying a three-dimensional (3D) map on a touchable screen, the users can also adjust map display content by gestures, such as scaling up and down.

At present, in an implementation scheme of human-computer interaction for the 3D map, the translation of a map display view angle is usually controlled by one finger, e.g., adjusting a horizontal/vertical movement of the map on the screen of the mobile terminal by one finger; and zoom-in/zoom-out, rotation and the like of the map display view angle is controlled by two fingers, e.g., the map display view angle is reduced by pinching with two fingers, or rotated with two fingers based on horizontal and vertical directions. However, in general display control of the 3D map, when one type of interaction is locked by two fingers, transformation of other view angles cannot be performed at the same time, for example, only scaling and/or horizontal rotation, scaling and/or vertical rotation, or the like can be performed. If needing to switch to other interactive modes, it is necessary to re-operate with two fingers off the screen, which makes a display interactive operation of the map cumbersome.

It should be noted that the information disclosed in Background above is only configured to enhance an understanding to the background of the present disclosure, and thus may include information that does not constitute the prior art known to those of ordinary skill in the art.

SUMMARY OF THE INVENTION

In view of this, the present disclosure provides a method and an apparatus for adjusting map display.

According to one aspect of the present disclosure, a method for adjusting map display is provided. The method includes:

acquiring adjustment gesture data in response to receiving an adjustment instruction of a map display page, where the adjustment instruction is sent by a user on the map display page by a touch display screen, and the adjustment gesture data at least includes an adjustment start finger position and an adjustment end finger position;

analyzing the adjustment gesture data to acquire adjustment indexes, where the adjustment indexes are configured to identify a position change of an adjustment gesture in a current map display adjustment process; and scaling the map display page according to the adjustment indexes and rotating the map display page at a first view angle and a second view angle, where the first view angle is a view angle in a map parallel plane and the second view angle is a view angle in a map tangent plane.

According to another aspect of the present disclosure, an apparatus for adjusting map display is provided. The apparatus includes:

an acquisition module, configured to acquire adjustment gesture data in response to receiving an adjustment instruction of a map display page, where the adjustment instruction is sent by a user on the map display page by a touch display screen, and the adjustment gesture data at least includes an adjustment start finger position and an adjustment end finger position;

an analysis module, configured to analyze the adjustment gesture data to acquire adjustment indexes, where the adjustment indexes are configured to identify a position change of an adjustment gesture in a current map display adjustment process;

a scaling module, configured to scale the map display page according to the adjustment indexes; and a rotation module, configured to rotate the map display page at a first view angle and a second view angle according to the adjustment indexes.

According to yet another aspect of the present disclosure, a storage medium is provided. The storage medium has at least one executable instruction stored therein, the executable instruction causing a processor to execute operations corresponding to the above method for adjusting map display.

According to still a further aspect of the present disclosure, a terminal is provided. The terminal includes: a processor, a memory, a communication interface and a communication bus, where the processor, the memory and the communication interface communicate with each other through the communication bus; and the memory is configured to store at least one executable instruction, the executable instruction causing the processor to execute operations corresponding to the above method for adjusting map display.

The above descriptions are only an overview of the technical solutions of the present disclosure, and in order to understand the technical means of the present disclosure more clearly to implement them according to contents of the description, and in order to make the above and other purposes, features and advantages of the present disclosure more obvious and understandable, the following is specific embodiments of the present disclosure.

BRIEF DESCRIPTION OF THE DRAWINGS

Various other advantages and benefits will become clear to those of ordinary skill in the art by reading the following detailed descriptions of the implementations. The accompanying drawings are only for the purpose of illustrating preferred implementations, and are not considered as limiting the present disclosure. Moreover, the same components are denoted by the same reference signs throughout the accompanying drawings. In the drawings.

DETAILED DESCRIPTION

Figure 1:
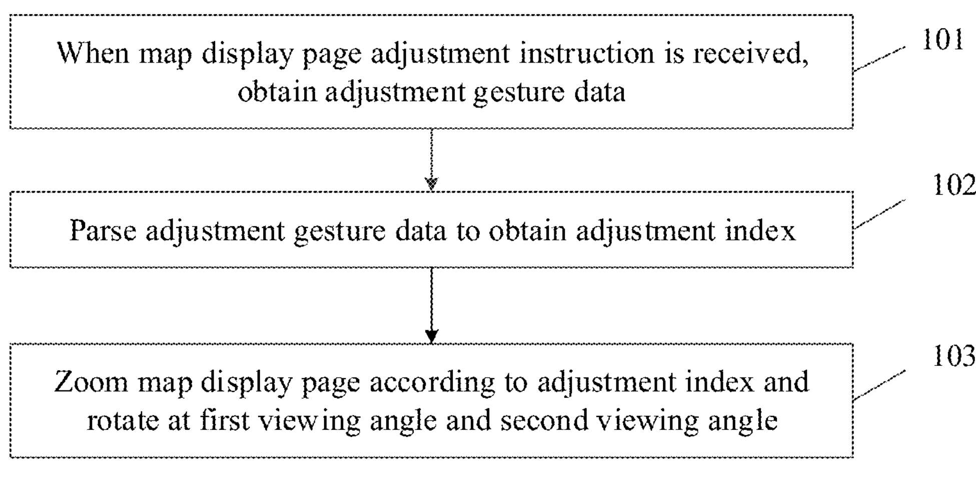
FIG. 1 shows a flowchart of a method for adjusting map display according to an embodiment of the present disclosure.

Exemplary embodiments of the present disclosure will be described in more detail below with reference to the accompanying drawings. Although exemplary embodiments of the present disclosure are shown in the drawings, it should be understood that the present disclosure can be implemented in various forms and should not be limited by the embodiments set forth herein. On the contrary, these embodiments are provided for a more thorough understanding to the present disclosure, and will fully convey the scope of the present disclosure to those skilled in the art.

In general display control of a 3D map, when one type of interaction is locked by two fingers, transformation of other view angles cannot be performed at the same time, for example, only scaling and/or horizontal rotation, scaling and/or vertical rotation, or the like can be performed. If needing to switch to other interactive modes, it is necessary to re-operate with two fingers off the screen, which makes a display interactive operation of the map cumbersome. An embodiment of the present disclosure provides a method for adjusting map display. As shown in FIG. 1, the method includes the following steps.

In 101, adjustment gesture data is acquired in response to receiving an adjustment instruction of a map display page.

The adjustment instruction is sent by a user on the map display page by a touch display screen, and the adjustment gesture data at least includes an adjustment start finger position and an adjustment end finger position. The touch display screen may be configured in a mobile terminal device, a site guide device, a mobile robot, etc. The adjustment finger position may be determined by establishing a coordinate system in a plane where the touch display screen is located and according to a touch point of a finger in the coordinate system, and specifically, may be acquired by calling a preset interface or a preset algorithm when the finger touches the display screen, which is not specifically limited by the embodiments of the present application.

In an embodiment of the present application, the adjustment instruction of the map display page may be sent when the user presses the touch display screen with a finger for a short time. For example, when the finger of the user moves after staying on a mobile phone screen for 0.2 second, it can be determined that the current user operation is to adjust the map display page, and then the adjustment instruction of the map display page is triggered to be sent to a server, so that the server can adjust the map display page according to a user operation.

It should be noted that the terminal device may download a corresponding map application program through the Internet and load map data to be stored locally or in the cloud in advance, so that the map display page can be adjusted and displayed according to the user operation during use.

In 102, the adjustment gesture data is analyzed to acquire adjustment indexes.

The adjustment indexes are configured to identify the position change of an adjustment gesture in the current adjustment process of map display. Specifically, the adjustment indexes may be a distance between the fingers, or a position change of a certain reference point (e.g., a midpoint of a connecting line between two fingers), or a position change of the finger on the touch display screen, etc., which is not specifically limited by the embodiments of the present application.

In an embodiment of the present application, by analyzing the data generated when the user adjusts the map display page, the data that can identify the position change of the adjustment gesture can be acquired. For example, according to the adjustment gesture data, it is determined that the adjustment gesture is a movement of a finger 1 from $a_1$ to $a_2$ and a movement of a finger 2 from $b_1$ to $b_2$, and then these two sets of finger data may serve as the adjustment indexes in this step.

In 103, the map display page is scaled and rotated at a first view angle and a second view angle according to the adjustment indexes.

The first view angle is a view angle in a map parallel plane, and the second view angle is a view angle in a map tangent plane. Specifically, this step may include: determining an adjustment scaling ratio according to the adjustment indexes, e.g., judging whether two fingers of the user make a pinched or stretched operation according to positions of the two fingers, and correspondingly scaling the map display page according to the degree of pinching or stretching; and determining rotation angles of the first view angle and the second view angle according to the adjustment indexes, e.g., calculating the rotation angles in the two view angles according to a displacement of a certain reference point of the two fingers in the adjustment process.

The present disclosure provides a method and an apparatus for adjusting map display, a storage medium and a terminal. Compared with the related art, in the embodiments of the present disclosure, the adjustment gesture data is acquired when receiving the adjustment instruction of the map display page, where the adjustment instruction is sent by the user on the map display page by the touch display screen, and the adjustment gesture data at least includes the adjustment start finger position and the adjustment end finger position, the adjustment gesture data is analyzed to acquire the adjustment indexes, where the adjustment indexes are configured to identify the position change of the adjustment gesture in the current map display adjustment process; and according to the adjustment indexes, the map display page is scaled and rotated at the first view angle and the second view angle, where the first view angle is a view angle in the map parallel plane and the second view angle is a view angle in the map tangent plane. The adjustment indexes which can identify the position change of the adjustment gesture are determined according to the adjustment finger position generated when the user adjusts the map display. According to the adjustment indexes, the map display page is adjusted at three view angles at the same time: zoom-in/zoom-out, rotation in the map parallel plane and rotation in the map tangent plane, so that the user can implement multi-view angle adjustment through one operation without the need of frequent switching operations to adjust the map display from different view angles, thereby simplifying the adjustment operation of the map display page and improving use experience of the user.

Figure 2:
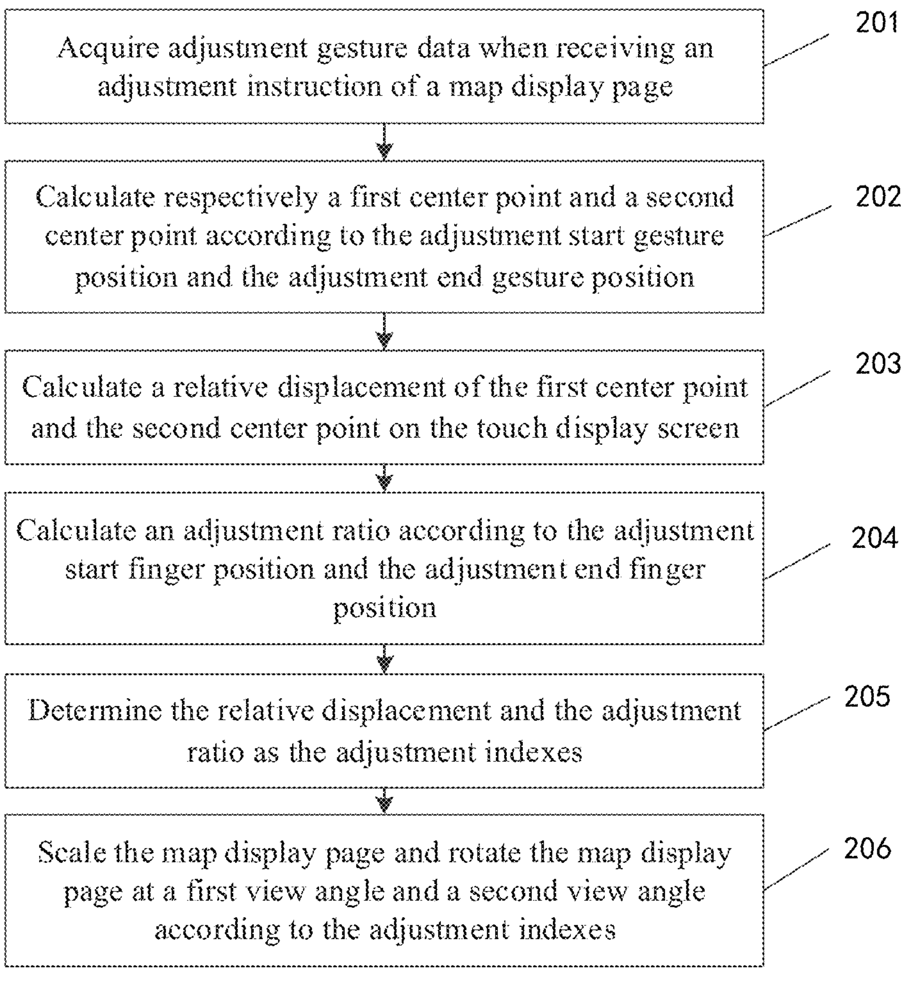
FIG. 2 shows a flowchart of another method for adjusting map display according to an embodiment of the present disclosure.

As a refinement and extension of the specific implementation of the above embodiments, in order to fully explain the specific implementation process of this embodiment, another method for adjusting map display is provided. As shown in FIG. 2, the method includes the following steps.

In 201, adjustment gesture data is acquired in response to receiving an adjustment instruction of a map display page.

The adjustment instruction is sent by a user on the map display page by a touch display screen, and the adjustment gesture data at least includes an adjustment start finger position and an adjustment end finger position. The concept explanation and specific implementation in this step may refer to the corresponding descriptions in step 101, which is not repeated by the embodiments of the present application here.

In an embodiment of the present application, after step 201, the method may further include: judging whether the adjustment gesture is a two-finger gesture according to the adjustment gesture data; calculating a drag displacement according to the adjustment start gesture position and the adjustment end gesture position if the adjustment gesture is a single-finger gesture, where the drag displacement is a corresponding displacement of the finger on the touch display screen in the adjustment process; and moving the map display page in the map parallel plane according to the drag displacement. If the adjustment gesture is the two-finger gesture, step 202 is executed.

In an embodiment of the present application, whether the gesture is the single-finger gesture or the two-finger gesture is judged according to the acquired adjustment gesture data, map translation adjustment is carried out when the gesture is judged as the single-finger gesture, and the gesture data is further analyzed when the gesture is judged as the two-finger gesture to acquire the adjustment indexes contained in the gesture data, thereby avoiding the problem of resource waste caused by direct data analysis and ensuring the adjustment accuracy of the map display page.

In 202, a first center point and a second center point are calculated respectively according to the adjustment start gesture position and the adjustment end gesture position.

The first center point is a midpoint position of a connecting line of two finger positions at the start of adjustment, and the second center point is a midpoint position of a connecting line of the two finger positions at the end of adjustment.

In an embodiment of the present application, the center point between the two fingers is taken as a reference point, so as to judge an adjustment direction and an adjustment amount in the adjustment process according to a position change of the reference point. Other point positions may also be selected as the reference point for judgment and measurement, which is not specifically limited by the embodiments of the present application.

Specifically, the implementation of this step may include: acquiring position coordinates of the two fingers of the user in an operation process, and calculating coordinates of the center point between the two fingers according to the position coordinates, where the coordinate values of the finger positions may be calculated by methods in the related art, which is not specifically limited by the embodiments of the present application.

Exemplarily, in the adjustment process of the map display page executed by the user, the adjustment start finger position is $[(x_1, y_1), (x_2, y_2)]$, that is, the coordinates of the two fingers at the start of adjustment are $x_1$, $y_1$ and $x_2$, $y_2$ respectively, the adjustment end gesture position is $[(x_1', y_1'), (x_2', y_2')]$, and then the positions of the first center point and the second center point may be respectively calculated as $$\left(\frac{x_1+x_2}{2}, \frac{y_1+y_2}{2}\right) \text{ and } \left(\frac{x_1'+x_2'}{2}, \frac{y_1'+y_2'}{2}\right).$$

In 203, a relative displacement of the first center point and the second center point on the touch display screen is calculated.

Since the coordinates of the two center points have been calculated in the above step, the relative displacement can be calculated according to the coordinates of the two points in this step.

In an embodiment of the present application, the center point of the fingers is taken as the reference point in the adjustment process of the map display page, so that the center point between the two fingers at the adjustment start position and the center point between the two fingers at the adjustment end position are calculated respectively, the corresponding displacement of the reference points in the screen display adjustment process can be determined, and then the display page is rotated and controlled according to the displacement.

In 204, an adjustment ratio is calculated according to the adjustment start finger position and the adjustment end finger position.

The adjustment ratio is a ratio of a distance between the two fingers at the end of adjustment to a distance between the two fingers at the start of adjustment.

According to the content described in step 202 above, the acquired adjustment gesture data includes the positions of the two fingers at a start moment and the positions of the two fingers at an end moment in the adjustment process, so that the distance between the two fingers at the start moment and the distance between the two fingers at the end moment can be calculated, and then the adjustment ratio described in this step can be acquired in combination with a ratio of the two distances.

It should be noted that in an embodiment of the present application, an execution order of step 204 and step 202 is not limited, that is, step 204 and step 202 may be executed in parallel or separately.

In 205, the relative displacement and the adjustment ratio are determined as the adjustment indexes.

In an embodiment of the present application, the adjustment ratio and the relative displacement are calculated respectively, and determined as the adjustment indexes, so that scaling of the map display page and rotation of the map display page at different angles can be controlled respectively according to these two adjustment indexes, which can not only realize the display adjustment of the map display page at a plurality of angles, but also ensure the adjustment accuracy of the map display page.

In 206, the map display page is scaled and is rotated at a first view angle and a second view angle according to the adjustment indexes.

The first view angle is a view angle in a map parallel plane, and the second view angle is a view angle in a map tangent plane.

Specifically, this step may include: respectively calculating a first displacement and a second displacement corresponding to the adjustment displacement; calculating a first angle and a second angle which respectively correspond to the first displacement and the second displacement according to a preset algorithm; rotating the map display page at the first view angle according to the first angle and rotating the map display page at the second view angle according to the second angle. The first displacement is a component of the adjustment displacement in a horizontal direction of the touch display screen, and the second displacement is a component of the adjustment displacement in a vertical direction of the touch display screen. The preset algorithm may be one or more of a matrix, a function, or a preset mapping relationship between the adjustment displacement and an adjustment angle. After the rotation angles are determined, the manner of controlling the map display page to rotate according to the rotation angles may be an implementation in the related art, which is not specifically limited by the embodiments of the present application.

In one embodiment, this step may further include: when the adjustment ratio is greater than 1, scaling up the map display page according to the adjustment ratio; and when the adjustment ratio is less than 1, scaling down the map display page according to the adjustment ratio.

When the adjustment ratio is greater than 1, it is indicated that the distance between the two fingers increases in the adjustment process, that is, the fingers of the user are in a stretching state, which is judged as view angle scaling up at this time, so that the map display page is scaled up and displayed according to the adjustment ratio. When the adjustment ratio is less than 1, it is indicated that the distance between the two fingers decreases in the adjustment process, that is, the fingers of the user are in a pinching state, which is judged as view angle scaling down at this time, so that the map display page is scaled down and displayed according to the adjustment ratio. In an actual application process, a scaling ratio of the map may be the same as the calculated adjustment ratio, or may be positively related to the adjustment ratio, that is, the page may be scaled up according to the adjustment ratio of 1:1, or may be scaled according to a preset ratio relationship.

In an embodiment of the present application, the relative displacement of the reference point, such as the center point of the connecting line between the two finger positions in the two-finger gesture in the present embodiment, in the adjustment process is converted into the adjustment angle, the rotation of the map display page in two reference planes is adjusted by using the adjustment angle respectively, and the map display page is scaled according to the change of the distance between the two fingers in the adjustment process, which realizes that the user can adjust the map display page at a plurality of angles when performing one operation, so that the user does not need to operate for many times to switch the map page display in different view angles, thereby simplifying the display adjustment operation of the map page and improving the user experience.

The present disclosure provides a method and an apparatus for adjusting map display. Compared with the related art, in the embodiment of the present disclosure, the adjustment gesture data is acquired when receiving the adjustment instruction of the map display page, where the adjustment instruction is sent by the user on the map display page by the touch display screen, and the adjustment gesture data at least includes the adjustment start finger position and the adjustment end finger position; the adjustment gesture data is analyzed to acquire the adjustment indexes, where the adjustment indexes are configured to identify the position change of the adjustment gesture in the current map display adjustment process; according to the adjustment indexes, the map display page is scaled and rotated at the first view angle and the second view angle, where the first view angle is a view angle in the map parallel plane and the second view angle is a view angle in the map tangent plane. The adjustment indexes which can identify the position change of the adjustment gesture are determined according to the adjustment finger position generated when the user adjusts the map display. According to the adjustment indexes, the map display page is adjusted at three view angles at the same time: zoom-in/zoom-out, rotation in the map parallel plane and rotation in the map tangent plane, so that the user can implement multi-view angle adjustment through one operation without the need of frequent switching operations to adjust the map display from different view angles, thereby simplifying the adjustment operation of the map display page and improving the use experience of the user.

Figure 3:
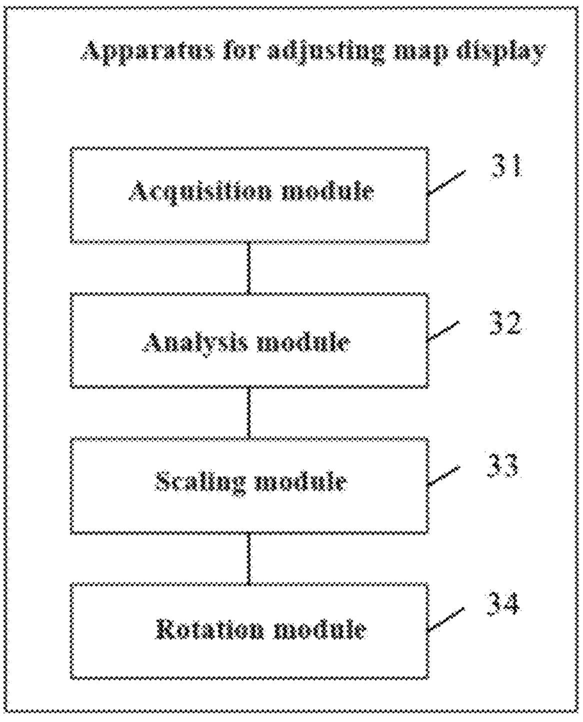
FIG. 3 shows a block diagram of an apparatus for adjusting map display according to an embodiment of the present disclosure.

As an implementation of the method shown in FIG. 1 above, an embodiment of the present application provides an apparatus for adjusting map display. As shown in FIG. 3, the apparatus includes an acquisition module 31, an analysis module 32, a scaling module 33, and a rotation module 34.

The acquisition module 31 is configured to acquire adjustment gesture data in response to receiving an adjustment instruction of a map display page, where the adjustment instruction is sent by a user on the map display page by a touch display screen, and the adjustment gesture data at least includes an adjustment start finger position and an adjustment end finger position.

The analysis module 32 is configured to analyze the adjustment gesture data to acquire adjustment indexes, where the adjustment indexes are configured to identify a position change of an adjustment gesture in a current adjustment process of map display.

The scaling module 33 is configured to scale the map display page according to the adjustment indexes.

The rotation module 34 is configured to rotate the map display page at a first view angle and a second view angle according to the adjustment indexes.

Figure 4:
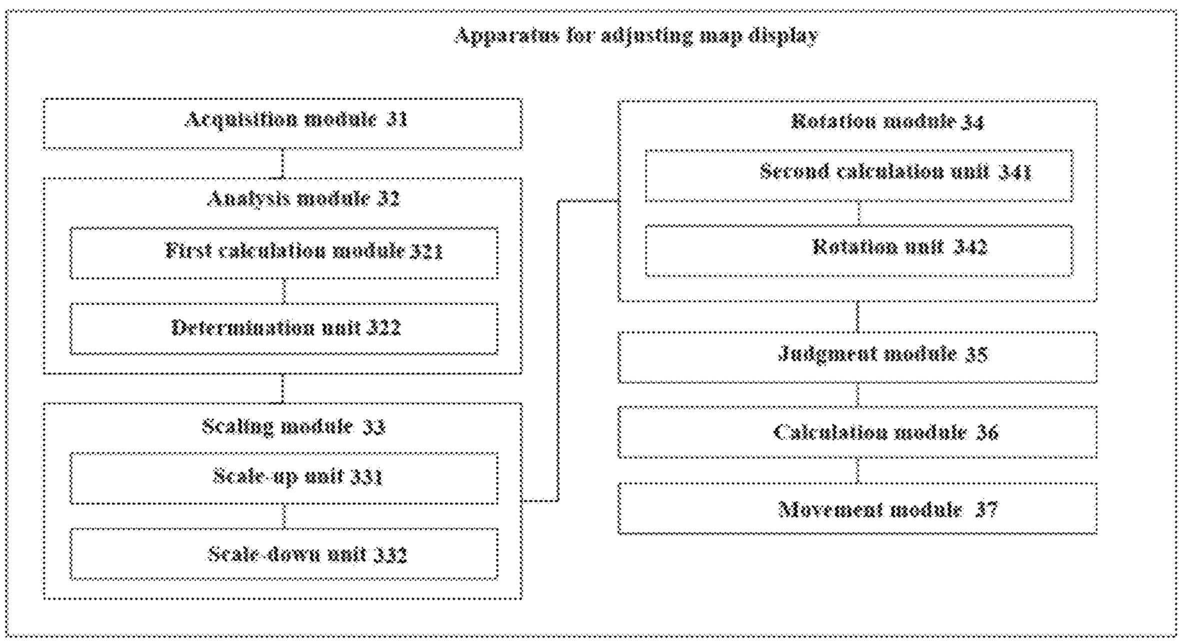
FIG. 4 shows a block diagram of another apparatus for adjusting map display according to an embodiment of the present disclosure.

In one embodiment, as shown in FIG. 4, the analysis module 32 includes:

a first calculation unit 321, configured to respectively calculate a first center point and a second center point according to the adjustment start gesture position and the adjustment end gesture position, where the first center point is a midpoint position of a connecting line of two finger positions at the start of adjustment, and the second center point is a midpoint position of a connecting line of two finger positions at the end of adjustment;

the first calculation unit 321 being further configured to calculate a relative displacement of the first center point and the second center point on the touch display screen;

the first calculation unit 321 being further configured to calculate an adjustment ratio according to the adjustment start finger position and the adjustment end finger position, where the adjustment ratio is a ratio of a distance between two fingers at the end of adjustment to a distance between two fingers at the start of adjustment; and a determination unit 322, configured to determine the relative displacement and the adjustment ratio as the adjustment indexes.

In one embodiment, the rotation module 34 includes:

a second calculation unit 341, configured to respectively calculate a first displacement and a second displacement corresponding to an adjustment displacement, where the first displacement is a component of the adjustment displacement in a horizontal direction of the touch display screen, and the second displacement is a component of the adjustment displacement in a vertical direction of the touch display screen;

the second calculation unit 341 being further configured to calculate a first angle and a second angle which respectively correspond to the first displacement and the second displacement according to a preset algorithm; and a rotation unit 342, configured to rotate the map display page at the first view angle according to the first angle and rotate the map display page at the second view angle according to the second angle.

In one embodiment, the scaling module 33 includes:

a scale-up unit 331, configured to scale up the map display page according to the adjustment ratio when the adjustment ratio is greater than 1; and a scale-down unit, configured to scale down the map display page according to the adjustment ratio when the adjustment ratio is less than 1.

In one embodiment, the apparatus further includes:

a judgment module 35, configured to judge whether the adjustment gesture is a two-finger gesture according to the adjustment gesture data.

In one embodiment, the analysis module 32 is specifically configured to analyze the adjustment gesture data to acquire the adjustment indexes if the judgment module judges that the adjustment gesture is the two-finger gesture.

In one embodiment, the apparatus further includes:

a calculation module 36, configured to calculate a drag displacement according to the adjustment start gesture position and the adjustment end gesture position if the judgment module judges that the adjustment gesture is a single-finger gesture, where the drag displacement is a corresponding displacement of the finger on the touch display screen in the adjustment process; and a movement module 37, configured to move the map display page in the map parallel plane according to the drag displacement.

The present application provides a method and an apparatus for adjusting map display. Compared with the related art, in the embodiment of the present disclosure, the adjustment gesture data is acquired when receiving the adjustment instruction of the map display page, where the adjustment instruction is sent by the user on the map display page by the touch display screen, and the adjustment gesture data at least includes the adjustment start finger position and the adjustment end finger position; the adjustment gesture data is analyzed to acquire the adjustment indexes, where the adjustment indexes are configured to identify the position change of the adjustment gesture in the current adjustment process of map display; according to the adjustment indexes, the map display page is scaled and rotated at the first view angle and the second view angle, where the first view angle is a view angle in the map parallel plane and the second view angle is a view angle in the map tangent plane. The adjustment indexes which can identify the position change of the adjustment gesture are determined according to the adjustment finger position generated when the user adjusts the map display. According to the adjustment indexes, the map display page is adjusted at three view angles at the same time: zoom-in/zoom-out, rotation in the map parallel plane and rotation in the map tangent plane, so that the user can implement multi-view angle adjustment through one operation without the need of frequent switching operations to adjust the map display from different view angles, thereby simplifying the adjustment operation of the map display page and improving the use experience of the user.

According to an embodiment of the present disclosure, a storage medium is provided. The storage medium has at least one executable instruction stored therein, where the computer executable instruction can execute the method for adjusting map display in any of the above method embodiments.

Figure 5:
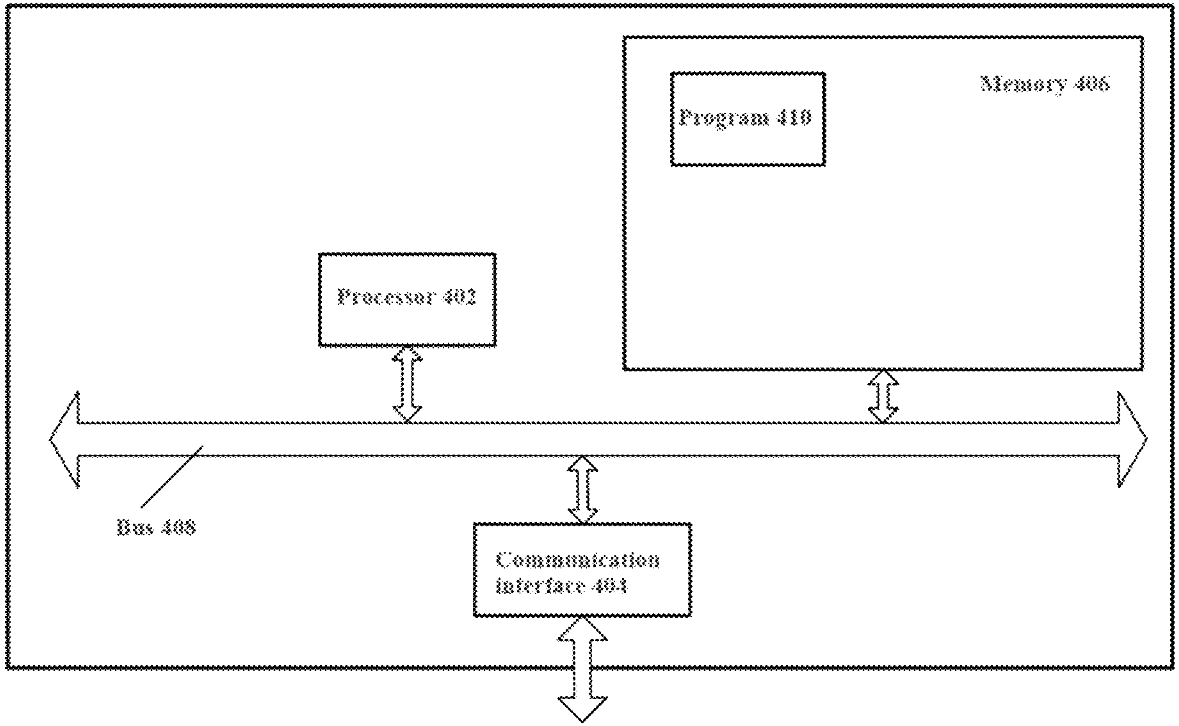
FIG. 5 shows a schematic structural diagram of a terminal according to an embodiment of the present disclosure.
Figure 6A:
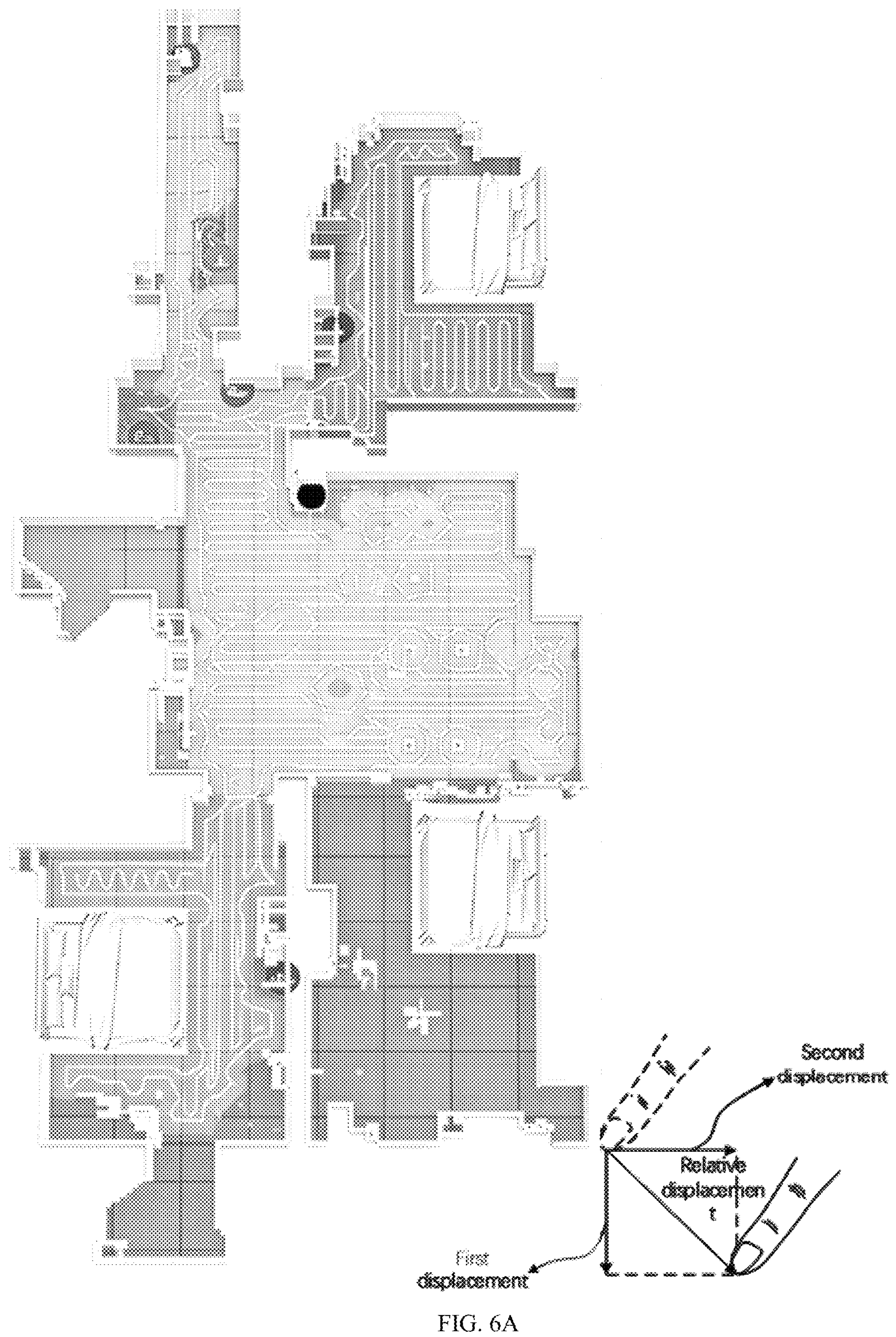
FIG. 6A and FIG. 6B respectively show the map display before and after adjustment by a finger.
Figure 6B:
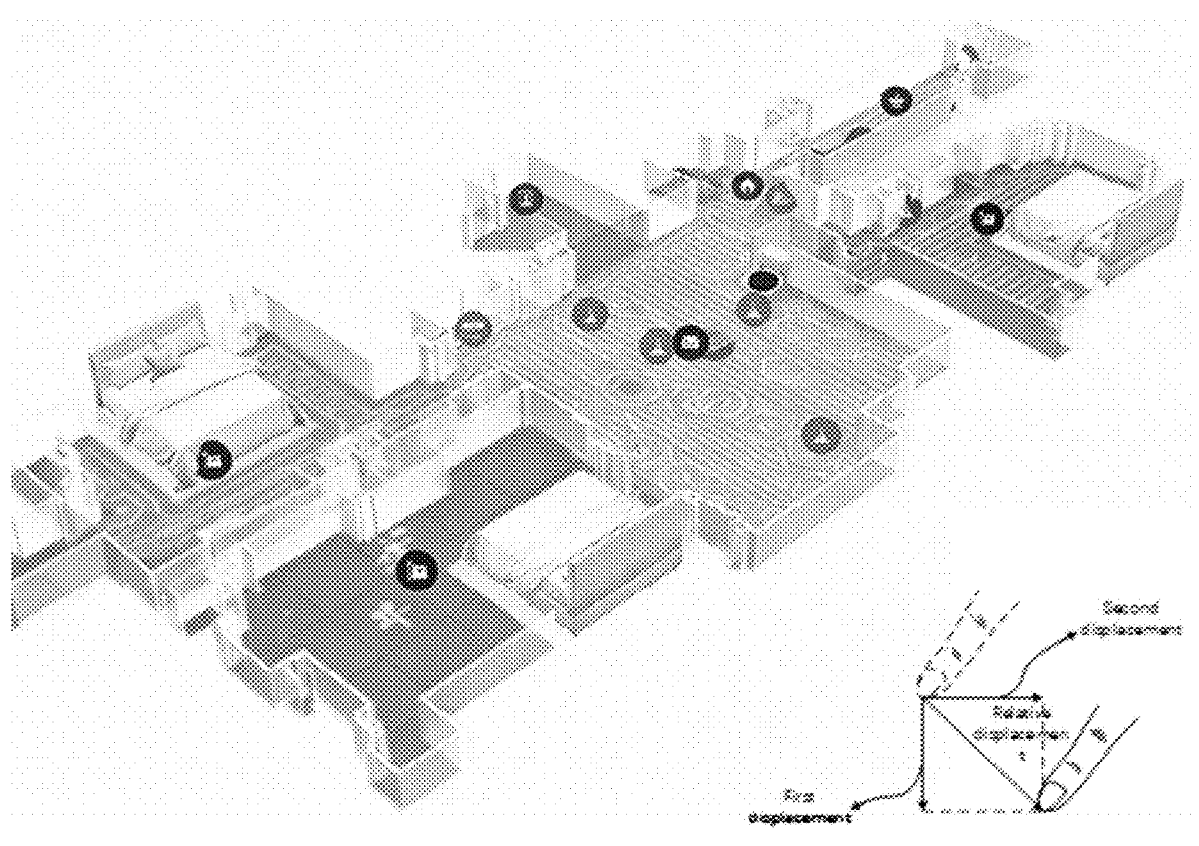

FIG. 5 shows a schematic structural diagram of a terminal according to an embodiment of the present disclosure, and the specific embodiment of the present disclosure does not limit the specific implementation of the terminal.

As shown in FIG. 5, the terminal may include a processor 402, a communication interface 404, a memory 406, and a communication bus 408.

The processor 402, the communication interface 404 and the memory 406 communicate with each other through the communication bus 408.

The communication interface 404 is configured to communicate with network elements of other devices, such as clients or other servers.

The processor 402 is configured to execute a program 410, and may specifically execute the relevant steps in the above embodiments of the method for adjusting map display.

Specifically, the program 410 may include program codes, and the program codes include computer operation instructions.

The processor 402 may be a central processing unit (CPU), or an application specific integrated circuit (ASIC), or one or more integrated circuits configured to implement the embodiments of the present disclosure. One or more processors included in the terminal may be the same type of processors, such as one or more CPUs, or may also be different types of processors, such as one or more CPUs and one or more ASICs.

The memory 406 is configured to store the program 410. The memory 406 may include a high-speed RAM memory, or may also include a non-volatile memory, such as at least one disk memory.

The program 410 may be specifically configured to cause the processor 402 to execute the following operations:

acquiring adjustment gesture data in response to receiving an adjustment instruction of a map display page, where the adjustment instruction is sent by a user on the map display page by a touch display screen, and the adjustment gesture data at least includes an adjustment start finger position and an adjustment end finger position;

analyzing the adjustment gesture data to acquire adjustment indexes, where the adjustment indexes are configured to identify a position change of an adjustment gesture in a current adjustment process of map display; and scaling the map display page and rotating the map display page at a first view angle and a second view angle according to the adjustment indexes, where the first view angle is a view angle in a map parallel plane and the second view angle is a view angle in a map tangent plane.

Obviously, those skilled in the art should understand that the above modules or steps of the present disclosure may be implemented by a general computing apparatus, they may be centralized on a single computing apparatus or distributed on a network composed of a plurality of computing apparatuses. Optionally, they may be implemented by program codes executable by the computing apparatus, so that they can be stored in a storage apparatus and executed by the computing apparatus. In some cases, the steps shown or described may be executed in a different order from here, or may be respectively manufactured into respective integrated circuit modules, or a plurality of modules or steps may be manufactured into a single integrated circuit module. As such, the present disclosure is not limited to any particular combination of hardware and software.

Described above are merely preferred embodiments of the present disclosure, and are not intended to limit the present disclosure. For those skilled in the art, the present disclosure may have various alterations and variations. Within the spirit and principles of the present disclosure, any modifications, equivalent substitutions, improvements, and the like are within the protection scope of the present disclosure.

What is claimed is:

1. A method for adjusting map display, comprising:

acquiring adjustment gesture data in response to receiving an adjustment instruction of a map display page, wherein the adjustment instruction is sent by a user on the map display page by a touch display screen, and the adjustment gesture data at least comprises an adjustment start finger position and an adjustment end finger position;

analyzing the adjustment gesture data to acquire adjustment indexes, wherein the adjustment indexes are configured to identify a position change of an adjustment gesture in a current map display adjustment process; and according to the adjustment indexes, adjusting the map display page at three view angles at the same time: zoom-in/zoom-out, rotation in a map parallel plane and rotation in a map tangent plane, wherein the analyzing the adjustment gesture data to acquire the adjustment indexes comprises:

respectively calculating a first center point and a second center point according to the adjustment start gesture position and the adjustment end gesture position, wherein the first center point is a midpoint position of a connecting line of two finger positions at a start of adjustment, and the second center point is a midpoint position of a connecting line of the two finger positions at an end of adjustment; and calculating a relative displacement of the first center point and the second center point on the touch display screen, wherein the rotation in the map parallel plane and the rotation in the map tangent plane according to the adjustment indexes comprises:

respectively calculating a first displacement and a second displacement corresponding to the relative displacement, wherein the first displacement is a component of the relative displacement in a horizontal direction of the touch display screen, and the second displacement is a component of the relative displacement in a vertical direction of the touch display screen;

calculating a first angle and a second angle which respectively correspond to the first displacement and the second displacement according to a preset algorithm; and rotating the map display page in the map parallel plane according to the first angle and rotating the map display page in the map tangent plane according to the second angle.

2. The method according to claim 1, wherein the analyzing the adjustment gesture data to acquire the adjustment indexes further comprises:

calculating an adjustment ratio according to the adjustment start finger position and the adjustment end finger position, wherein the adjustment ratio is a ratio of a distance between two fingers at the end of adjustment to a distance between two fingers at the start of adjustment; and determining the relative displacement and the adjustment ratio as the adjustment indexes.

3. The method according to claim 2, wherein the scaling the map display page according to the adjustment indexes comprises:

scaling up the map display page according to the adjustment ratio in response to that the adjustment ratio is greater than 1; and scaling down the map display page according to the adjustment ratio in response to that the adjustment ratio is less than 1.

4. The method according to claim 1, wherein after acquiring the adjustment gesture data in response to receiving the adjustment instruction of the map display page, the method further comprises:

judging whether the adjustment gesture is a two-finger gesture according to the adjustment gesture data; and analyzing the adjustment gesture data to acquire the adjustment indexes comprises: analyzing the adjustment gesture data to acquire the adjustment indexes in response to that the adjustment gesture is the two-finger gesture.

5. The method according to claim 4, wherein the method further comprises:

calculating a drag displacement according to the adjustment start gesture position and the adjustment end gesture position in response to that the adjustment gesture is a single-finger gesture, wherein the drag displacement is a corresponding displacement of a finger on the touch display screen in the adjustment process; and moving the map display page in the map parallel plane according to the drag displacement.

6. An apparatus for adjusting map display, comprising:

a processor, a memory, a communication interface and a communication bus, wherein the processor, the memory and the communication interface communicate with each other through the communication bus; and the memory is configured to store at least one executable instruction, wherein the executable instruction causes the processor to:

acquire adjustment gesture data in response to receiving an adjustment instruction of a map display page, wherein the adjustment instruction is sent by a user on the map display page by a touch display screen, and the adjustment gesture data at least comprises an adjustment start finger position and an adjustment end finger position;

analyze the adjustment gesture data to acquire adjustment indexes, wherein the adjustment indexes are configured to identify a position change of an adjustment gesture in a current map display adjustment process; and according to the adjustment indexes, adjust the map display page at three view angles at the same time: zoom-in/zoom-out, rotation in a map parallel plane and rotation in a map tangent plane, wherein the processor is further configured to:

respectively calculate a first center point and a second center point according to the adjustment start gesture position and the adjustment end gesture position, wherein the first center point is a midpoint position of a connecting line of two finger positions at a start of adjustment, and the second center point is a midpoint position of a connecting line of the two finger positions at an end of adjustment;

calculate a relative displacement of the first center point and the second center point on the touch display screen;

respectively calculate a first displacement and a second displacement corresponding to the relative displacement, wherein the first displacement is a component of the relative displacement in a horizontal direction of the touch display screen, and the second displacement is a component of the relative displacement in a vertical direction of the touch display screen;

calculate a first angle and a second angle which respectively correspond to the first displacement and the second displacement according to a preset algorithm; and rotate the map display page in the map parallel plane according to the first angle and rotate the map display page in the map tangent plane according to the second angle.

7. The apparatus according to claim 6, wherein the processor is further configured to:

calculate an adjustment ratio according to the adjustment start finger position and the adjustment end finger position, wherein the adjustment ratio is a ratio of a distance between two fingers at the end of adjustment to a distance between the two fingers at the start of adjustment; and determine the relative displacement and the adjustment ratio as the adjustment indexes.

8. The apparatus according to claim 7, wherein the processor is further configured to:

scale up the map display page according to the adjustment ratio in response to that the adjustment ratio is greater than 1; and scale down the map display page according to the adjustment ratio in response to that the adjustment ratio is less than 1.

9. The apparatus according to claim 6, wherein the processor is further configured to:

judge whether the adjustment gesture is a two-finger gesture according to the adjustment gesture data; and analyze the adjustment gesture data to acquire the adjustment indexes in response to that the adjustment gesture is the two-finger gesture.

10. The apparatus according to claim 9, wherein the processor is further configured to:

calculate a drag displacement according to the adjustment start gesture position and the adjustment end gesture position in response to that the adjustment gesture is a single-finger gesture, wherein the drag displacement is a corresponding displacement of a finger on the touch display screen in the adjustment process; and move the map display page in the map parallel plane according to the drag displacement.

11. A non-transitory computer-readable storage medium, having at least one executable instruction stored therein, wherein the executable instruction causes a processor to:

acquire adjustment gesture data in response to receiving an adjustment instruction of a map display page, wherein the adjustment instruction is sent by a user on the map display page by a touch display screen, and the adjustment gesture data at least comprises an adjustment start finger position and an adjustment end finger position;

analyze the adjustment gesture data to acquire adjustment indexes, wherein the adjustment indexes are configured to identify a position change of an adjustment gesture in a current map display adjustment process; and according to the adjustment indexes, adjust the map display page at three view angles at the same time: zoom-in/zoom-out, rotation in a map parallel plane and rotation in a map tangent plane, wherein the processor is further configured to:

respectively calculate a first center point and a second center point according to the adjustment start gesture position and the adjustment end gesture position, wherein the first center point is a midpoint position of a connecting line of two finger positions at a start of adjustment, and the second center point is a midpoint position of a connecting line of the two finger positions at an end of adjustment;

calculate a relative displacement of the first center point and the second center point on the touch display screen;

respectively calculate a first displacement and a second displacement corresponding to the relative displacement, wherein the first displacement is a component of the relative displacement in a horizontal direction of the touch display screen, and the second displacement is a component of the relative displacement in a vertical direction of the touch display screen;

calculate a first angle and a second angle which respectively correspond to the first displacement and the second displacement according to a preset algorithm; and rotate the map display page in the map parallel plane according to the first angle and rotate the map display page in the map tangent plane according to the second angle.

12. The non-transitory computer-readable storage medium according to claim 11, wherein the processor is further configured to:

calculate an adjustment ratio according to the adjustment start finger position and the adjustment end finger position, wherein the adjustment ratio is a ratio of a distance between two fingers at the end of adjustment to a distance between the two fingers at the start of adjustment; and determine the relative displacement and the adjustment ratio as the adjustment indexes.

13. The non-transitory computer-readable storage medium according to claim 12, wherein the processor is further configured to:

scale up the map display page according to the adjustment ratio in response to that the adjustment ratio is greater than 1; and scale down the map display page according to the adjustment ratio in response to that the adjustment ratio is less than 1.

14. The non-transitory computer-readable storage medium according to claim 11, wherein the processor is further configured to:

judge whether the adjustment gesture is a two-finger gesture according to the adjustment gesture data; and analyze the adjustment gesture data to acquire the adjustment indexes in response to that the adjustment gesture is the two-finger gesture.

15. The non-transitory computer-readable storage medium according to claim 14, wherein the processor is further configured to:

calculate a drag displacement according to the adjustment start gesture position and the adjustment end gesture position in response to that the adjustment gesture is a single-finger gesture, wherein the drag displacement is a corresponding displacement of a finger on the touch display screen in the adjustment process; and move the map display page in the map parallel plane according to the drag displacement.

* * * * *